(12) United States Patent  
Shironoshita

(10) Patent No.: US 8,959,041 B2  
(45) Date of Patent: Feb. 17, 2015

(54) HYPOTHESIS VERIFICATION USING ONTOLOGIES, BELIEF AXIOMS, BELIEF ASSERTIONS, PREMISE AXIOMS, AND PREMISE ASSERTIONS

(76) Inventor: Emilio Patrick Shironoshita, Miami, FL (US)

( * ) Notice: Subject to any disclaimer, the term of this patent is extended or adjusted under 35 U.S.C. 154(b) by 0 days.

(21) Appl. No.: 13/484,937

(22) Filed: May 31, 2012

(65) Prior Publication Data

US 2013/0275354 A1     Oct. 17, 2013

Related U.S. Application Data

(60) Provisional application No. 61/570,510, filed on Dec. 14, 2011.

(51) Int. Cl.
| | | |
|---|---|---|
| *G06F 17/00* | (2006.01) | |
| *G06N 5/02* | (2006.01) | |
| *G06N 5/00* | (2006.01) | |

(52) U.S. Cl.
CPC . *G06N 5/02* (2013.01); *G06N 5/006* (2013.01)
USPC .......................................................... 706/45

(58) Field of Classification Search
USPC .............................................. 706/12, 45, 62
See application file for complete search history.

(56) References Cited

PUBLICATIONS

Callahan, Alison, Michel Dumontier, and Nigam Shah. "HyQue: evaluating hypotheses using Semantic Web technologies." Jul. 2010, Journal of biomedical semantics, pp. 1-16.*
Horridge et al., The OWL API: A Java API for OWL ontologies, Online Date Friday, Feb. 25, 2011 Journal Semantic Web Publisher IOS Press, pp. 1-11.*
Fisher et al., Reasoning in Semantic Web-based Systems, chapter 7, 2010 Semantic Web Information Management, Springer Link, pp. 127-146.*
Nguyen et al., Justification Patterns for OWL DL Ontologies, The Open University, May 25, 2011, pp. 1-16.*
Singh et al., A Comparative Study of Inference Engines, IEEE, 2010, pp. 1-5.*

* cited by examiner

*Primary Examiner* — David Vincent
(74) *Attorney, Agent, or Firm* — Mark Terry

(57) ABSTRACT

The present invention relates to computer implemented methods and system for verifying hypotheses against ontologies. The methods and systems are designed to accept as inputs a set of axioms and/or assertions constituting a hypothesis, and a set of ontology axioms and/or assertions assumed to be true; determine whether the axioms and assertions constituting the hypothesis are either supported or contradicted by the axioms and assertions in the ontology, and extract the specific ontology axioms and/or assertions that either support or contradict the hypothesis. The result of these methods and of the systems implementing these methods is an indication on whether the hypothesis is supported by the ontology, contradicted by it, or neither supported nor contradicted by it, and if either supported or contradicted, the set of axioms and/or assertions from the ontology that cause the support or contradiction of the hypothesis.

4 Claims, 1 Drawing Sheet

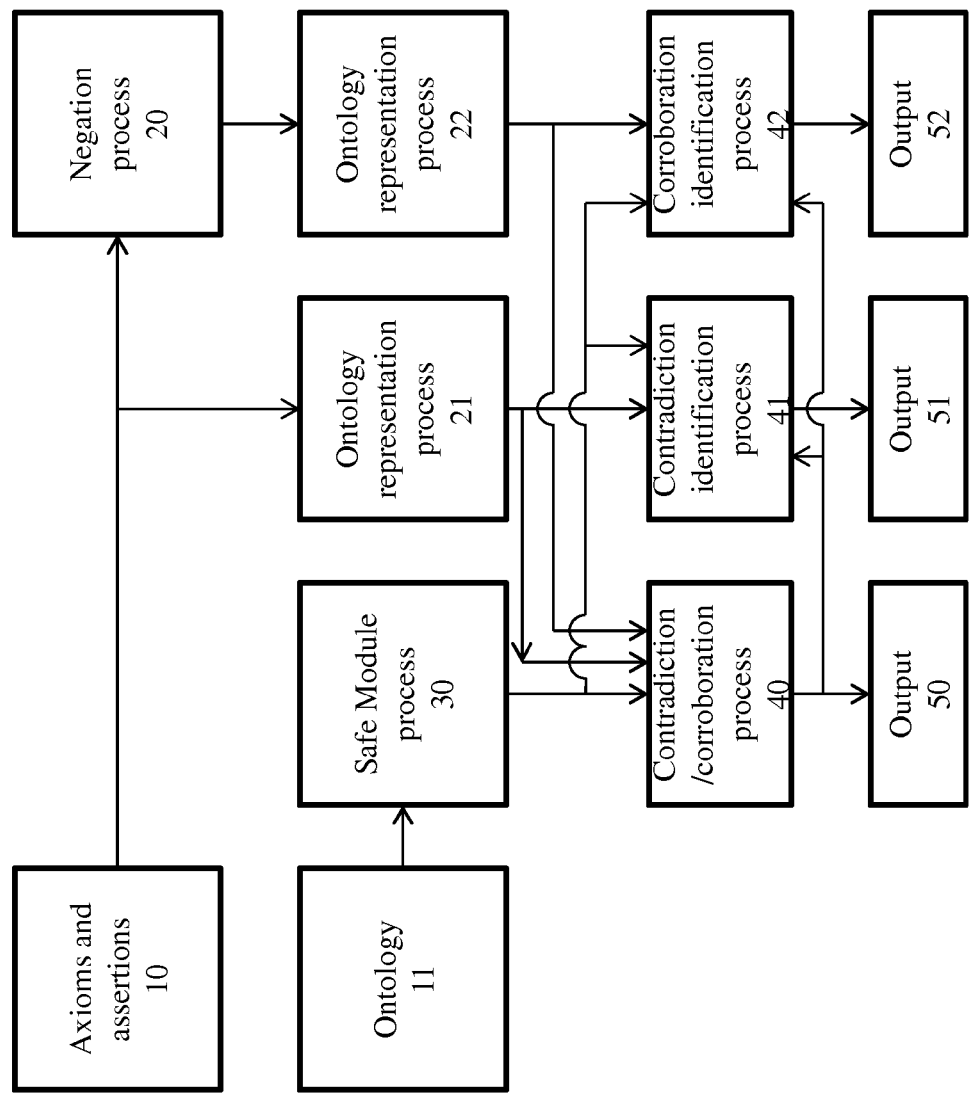

HYPOTHESIS VERIFICATION USING ONTOLOGIES, BELIEF AXIOMS, BELIEF ASSERTIONS, PREMISE AXIOMS, AND PREMISE ASSERTIONS

CROSS-REFERENCE TO RELATED APPLICATIONS

This application claims the benefit under 35 U.S.C. §119(e) of U.S. Provisional Patent Application No. 61/570,510, filed Dec. 14, 2011, which is hereby incorporated by reference herein in its entirety.

STATEMENT REGARDING FEDERALLY SPONSORED RESEARCH OR DEVELOPMENT

This invention was made with government support under R44GM097851 awarded by the National Institutes of Health (NIH). The government has certain rights in the invention.

FIELD OF THE INVENTION

The present invention generally relates to the verification of hypotheses against ontologies. More particularly, the present invention relates to computer implemented methods and systems that model a hypothesis as a set of axioms and/or assertions, test whether the axioms and/or assertions in the hypothesis are either supported or contradicted by an ontology, and extract the specific axioms and/or assertions from the ontology that support or contradict the set of axioms and/or assertions in the hypothesis.

STATEMENT REGARDING FEDERALLY SPONSORED RESEARCH AND DEVELOPMENT

Not applicable.

BACKGROUND OF THE INVENTION

The practice of scientific research requires that beliefs and intuitions be verified against accepted knowledge. Investigators delving into the details of gene functions or of signal transmission in neurons constantly test their hypotheses against multiple knowledge resources. The methodology presented in this patent application proposes the automation of this process of hypothesis verification with respect to ontologies and knowledge resources. It provides mechanisms to encode beliefs and to verify them against ontology ecosystems created through the alignment of multiple ontologies. Verification of these hypotheses results in sets of ontology axioms that either corroborate or contradict them.

Recent years have seen a considerable expansion in the development of ontologies, due to their success in structuring knowledge for many different applications. Ontologies have proven their utility and potential in the annotation of data in support of research. The roles of ontologies can be classified into three major categories: knowledge management, including the indexing and retrieval of data and information; data integration, exchange and semantic interoperability; and decision support and reasoning.

Ontologies take advantage of Description Logics (DL)-based formalisms to represent knowledge. DL provide a strong mathematical underpinning for ontologies conceptualized in this way, where expressivity of ontologies is defined based upon the types of axioms allowed. DL also define reasoning or inferencing capabilities over ontologies, whereby axioms not explicitly asserted can be inferred based on logical consequences. The basic reasoning mechanisms afforded by ontologies are classification, or the ability to determine relationships between classes, and instance checking, or the ability to determine membership of an individual in a given class. The OWL 2 Web Ontology Language has expressivity of SROIQ(D), and it has been shown to be decidable in terms of reasoning. OWL 2, a principal component of the Semantic Web, is used to formalize a domain, assert properties about individuals, and reason about classes and individuals.

The recent growth of related but independently developed ontologies in multiple domains has both enabled and fragmented the field making it difficult to realize the full potential of ontologies. In biomedical research for example, despite a reasonable overlap in terms and concepts, different ontologies intersect little in their relations suggesting that each ontology covers only a small subset of the full range of possible human disease concepts and circumstances.

SUMMARY OF THE INVENTION

In accordance with the present invention, computer implemented methods and systems are provided for verifying whether hypotheses consisting of a set of belief axioms and assertions are either corroborated or contradicted by the axioms and assertions contained in ontologies, and for extracting the set of ontology axioms and assertions that corroborate or contradict the hypotheses.

In accordance with some embodiments of the present invention, in response to receiving a hypothesis consisting of a set of belief axioms and/or assertions, and an ontology consisting of a set of axioms and/or assertions presumed to be true, calculations are performed to determine if the hypothesis is corroborated or contradicted by the ontology, and if so, to establish which axioms and assertions from the ontology cause the corroboration or contradiction to occur. In some embodiments, hypotheses are enriched with a set of premise axioms and/or assertions which are also presumed to be true for the purpose of verification.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Additional embodiments of the invention, its nature and its various advantages, will be more apparent upon consideration of the following detailed description, taken in conjunction with the accompanying drawings, in which like reference characters refer to like parts throughout, and in which:

FIG. 1 is a simplified illustration of the process of verification of a hypothesis and extraction of axioms and/or assertions from an ontology that corroborate or contradict the hypothesis.

DETAILED DESCRIPTION OF THE INVENTION

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention. FIG. 1 is an illustration of the process matter of this patent application, which shows inputs 10 and 11, processes 20, 21, 22, 30, 40, 41, and 42, and outputs 50, 51, and 52. Input 10 is a set of belief axioms and assertions. Input 11 is an ontology. Process 20 determines and extracts the negation of belief axioms and assertions. Process 21 is the conversion of input 10 into an ontology representation of belief axioms and assertions. Process 22 is the conversion of the output of Process 20 into an ontology representation. Process 30 is the extraction of a safe module from the ontology in input 11. Process 40 is the determination of whether hypothesis in input 10 is corroborated or contradicted by the ontology in input 11, the result of which is indicated in output 50. Process 41 is the determination of ontology axioms and assertions that contradict the belief axioms and assertions; these contradicting axioms and assertions constitute output 51. Process 42 is the determination of ontology axioms and assertions that corroborate the belief axioms and assertions; these corroborating axioms and assertions constitute output 52.

Belief Encoding Specification

An ontology $o$ can be conceptualized as a set of axioms and assertions, $o = \{\alpha_i\}$. The signature $Sig(o)$ of the ontology is the union of three disjoint sets: the set of classes C, the set of properties or relations P, and the set of instances I. Axioms define classes or properties, while assertions define membership of instances in classes and property relationships between instances. In this way, the ontology can be divided into a terminology box or TBox, which is the set of axioms, and an assertion box, or ABox, which is the set of assertions.

Similarly, a belief encoding B with respect to an ontology $o$ consists of a set of axioms and assertions over a subset of the entities in $o$ divided in two disjoint parts: a non-empty set $B_0$ of belief axioms and assertions, and a possibly empty set $B_p$ of premise axioms and assertions. Belief axioms express the beliefs to be verified, while premise axioms express facts that are to be assumed as true for purposes of verification of this particular belief. We call the ontology $o$ from where the entities were sourced the covering ontology for B.

Every class in B must be also defined by an individual member. To achieve this, belief encodings use a punning mechanism, where the same term can be used to denote both a class and an individual belonging to the class. Thus, any class $A \subseteq Sig(o)$ referenced by a belief axiom is defined as having a member of the same name, $A \in A$; any instance b of some class B used in a belief assertion is also defined to have an enveloping class of the same name, $b = \{b\}$, and to assert the axiom $b \sqsubseteq B$, which preserves the membership relation between b and B.

This punning mechanism enables more complete reasoning over the belief encoding axioms. As will be apparent in the discussion of hypothesis verification, our methods rely on the ability of ontology reasoners to derive useful inferences of concept satisfiability and instance checking Many useful inferences rely on the processing of subclass relationships, and therefore require that concepts be modeled as classes.

Ontologies can be encoded using diverse restrictions on the types of axioms and assertions that can be used within them, which defines their expressivity. The semantics of the ontology is given by an interpretation $I = (\Delta^I; \cdot^I)$, where $\Delta^I$ is the domain of interpretation, and $\cdot^I$ is a function that maps ontology entities to the domain. The semantics of belief encodings extends the semantics of the ontology, as follows:

| Axiom | Interpretation |
|---|---|
| Premise axiom $\beta_p$ | $\beta_p^I$ |
| Belief axiom $\beta$ with respect to ontology $o$ | $[b2o(\beta)]^I$ if $Sig(\beta) \subseteq Sig(o)$, otherwise $\emptyset$. |
| $A \sqsubseteq B$ (subclass) | $A^I \subseteq B^I$ and $A^I \in B^I$ |
| $A \in B$ (instance) | $A^I \subseteq B^I$ and $A^I \in B^I$ |

Note that $b2o(\beta)$ denotes the conversion of belief axioms to incorporate them with the ontology through the change in vocabulary namespace.

Ontology Module Extraction

The total number of entities in the covering ontology $o$ could be much larger than the number of entities from $o$ actually used in a belief encoding B, resulting in a hypothesis verification space much larger than required. To make the process of verification more efficient, a subset or module from $o$ that provides the same results as the original ontology will be derived.

We define a safe ontology module $mod(o,\alpha)$ of an ontology $o$ with respect to a belief axiom $\alpha$ such that $mod(o,\alpha) \models \alpha$ if and only if $o \models \alpha$, and $mod(o,\alpha) \models \neg\alpha$ if and only if $o \models \neg\alpha$, where the operator $\models$ signifies entailment. As long as we guarantee that the entailment related to axiom $\alpha$ is fulfilled, then verification against the ontology module $mod(o,\alpha)$ is equivalent to verification against the entire ontology. A module $mod(o,B)$ is safe with respect to a belief B if it is safe for every belief axiom $\beta \in B$.

The algorithm for ontology module extraction is defined by the following pseudocode:

```
Method OntologyModuleExtraction (ontology O, belief encoding B)
begin
    Convert belief encoding B to ontology B'
    Create empty ontology M
    Create empty list t
    Add all axioms and assertions from B' to t
    while t is not empty
        a := get next from t
        if a is not in M
            add a to M
            for every class c in a
                get all axioms from O that define c
                add all obtained axioms to t
```

-continued

```
        for every property p in a
            get all axioms from O that define p
            add all obtained axioms to t
        for every individual i in a
            get all assertions where i is mentioned
            add all obtained assertions to t
end
```

This algorithm starts with the belief axioms, and is designed to extract every ontology axiom that defines the classes, properties, and individuals of the axioms already in the ontology module.

Hypothesis Verification

Determination of corroboration or contradiction of hypotheses encoded as beliefs is proposed to be performed based on entailment justification. Given an ontology o and inferred axiom α such that $o \models \alpha$, a justification J is defined as a subset $J \subseteq o$ such that $J \models \alpha$, and there does not exist $J' \subseteq J$ such that $J' \models \alpha$. This patent application concerns the application of entailment justification to finding corroborations or contradictions of belief axioms, by verifying whether these axioms or their negations are supported by an ontology.

Ontologies may be linked with each other through mappings manually curated or generated using an ontology alignment algorithm, and aggregated to form ontology spaces, so that a set of ontologies unioned together form a single covering ontology o for a belief encoding B. Moreover, a covering ontology safe module mod(o,B) can be further defined as the safe module from o with respect to B. Then, in order to find evidence for the axioms in B, they are associated with a covering ontology safe module into two complementary verification spaces. The positive verification space is defined as H=b2o(B)∪ mod(o,B). The negative verification space takes the negation of each converted belief axiom from B, and is denoted as ₋H=₋b2o(B)∪ mod(o,B); note that premise axioms are not negated, since they are assumed to be facts for purposes of reasoning. The negation of axioms and assertions is defined as an axiom or assertion that results in an opposite truth value for all interpretations. The following table illustrates the most common axioms or assertions and their negations; other negations are defined depending on the expressivity of the ontology language used to define the ontologies.

| Ontology axiom or assertion | Negation of ontology axiom or assertion |
|---|---|
| Class expression | Complement of class expression |
| Data range expression | Complement of data range expression |
| Equivalent class axiom | Disjoint class axiom |
| Equivalent properties axiom | Disjoint properties axiom |
| Individual equality assertion | Individual inequality assertion |
| Class assertion | Complement of class assertion |
| Positive property assertion | Negative property assertion |

The procedures of hypothesis verification require the determination of whether a given hypothesis space H or ₋H is incoherent, that is, whether any class becomes unsatisfiable. Unsatisfiability is determined if the axioms in the ontology entail that a given class is a subclass of the bottom class ⊥, whose interpretation is always the empty set. Assuming that the covering ontology o is coherent and consistent, if a positive verification space is incoherent, then the belief B is contradicted by the ontology. If a negative verification space is incoherent, then B is corroborated by the ontology. If neither is incoherent, then the belief is consistent with (but not corroborated by) o. Note that the assumption that o is coherent is not particularly stringent, since one of the critical tasks of ontology engineers is precisely to ensure consistency and coherence of published ontologies. Determination of contradiction in this manner can then be achieved through the use of a standard reasoner appropriate for the type of ontology against which verification is being performed.

Extraction of Corroborating or Contradicting Assertions

Just providing a determination of contradiction is useful, but it is more useful to actually provide an explanation of the reasons for any contradiction, if a contradiction is found, or a minimal subset of corroboration, if such is found. In this manner, the proposed methodology can assist the user in pinpointing the exact causes of hypothesis acceptance or rejection.

The algorithm to extract the assertions that corroborate or contradict a hypothesis makes use of the following definitions. A minimum unsatisfiable group S is a set S of axioms or assertions that conflict with each other and can cause inconsistency or unsatisfiability of an ontology. If a graph G is used to represent this set S, where each node is an axiom or assertion and a link between two nodes represents their contradictory, G is a connected graph. A ontology mmu(o) is a minimal max-unsatisfiable sub-ontology of o, if mmu(o)⊆o and mmu(o) consists of all minimum unsatisfiable groups of o and every o' such that $o' \subseteq$ mmu(o) does not. Intuitively, the minimal max-unsatisfiable sub-ontology contains an explanation of the cause of incoherence. Then, the contradiction explanation ₋J of the belief encoding B is given by mmu(H), while the corroboration explanation J is given by mmu(₋H). The hypothesis verification mechanisms thus reduce to the implementation of mechanisms to find minimal max-unsatisfiable ontologies.

The algorithm to extract the minimal max-unsatisfiable sub-ontology of a hypothesis is as follows. Consider initially the set $U=\{u_i\}, i\in[1,n]\}$ of unsatisfiable concepts in a hypothesis H, and an empty ontology O'. If the set U is empty, then mmu(H) is empty and the hypothesis is not contradicted. Otherwise, for each $u_i$, we get a set $A_i$ of all axioms in H that mention $u_i$. We then add each axiom $\alpha_{ij}$ in $A_i$, one by one, to the ontology O', and verify consistency. At the addition of some $\alpha_{mn}$, the ontology O' becomes inconsistent. This triggers a recursive process where an ontology is incrementally built starting from axiom $\alpha_{mn}$, to find the set of axioms $S_{mn} \subseteq O'$ that cause the inconsistency. Then, mmu(H)= $U_{m,n} S_{mn}$ is the minimal max-unsatisfiable sub-ontology of H. The procedure of calculation of mmu(H) is given in the following:

```
Method GetMMU (hypothesis H)
begin
    U := get all unsatisfiable concepts from H
    Create an empty ontology O'
    for every u ∈ U
        A := get all axioms from H that mention u
        for every a ∈ A
            add a into O'
            check consistency of O'
            if O' is not consistent then
                S := findMUG(O', {a})
                Save contents of S into mmu(H)
                remove S from O'
            end if
        end for
    end for
    Return mmu(H)
end
Method findMUG(ontology O', set S)
begin
    A' := O' - S
    Create an ontology O"
    Load contents of S into O"
```

-continued

```
            if O" is not consistent
                return S
            end if
            for every a' ∈ A'
                add a' into O"
                check consistency of O"
                if O" is not consistent then
                    add a' to S
                    S := findMUG (O", S)
                end if
            end for
            return S
    end
```

Considerations on Presentation of the Proposed Process

It is understood herein that the detailed description may be presented in terms of program procedures executed on a computer or network of computers. These procedural descriptions and representations are the means used by those skilled in the art to most effectively convey the substance of their work to other skilled in the art.

A procedure is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over a smartphone, the Internet, an Intranet, etc. Either of these may be implemented as a distributed computer system rather than a single computer. Moreover, the processing could be controlled by a software program on one or more computer systems or processors, or could even be partially or wholly implemented in hardware.

Portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C++, or any assembly language appropriate in view of the processor being used. It could also be written in an object-oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A computer system for evaluating a hypothesis against an ontology, the computer system comprising:
    a memory storage;
    a network connection device communicatively coupled to a communications network; and
    a processing unit coupled to the memory storage, wherein the processing unit is configured for:
        receiving, over the communications network, a first set comprising a plurality of belief axioms, a plurality of belief assertions, a plurality of premise axioms, and a plurality of premise assertions, wherein the first set consists of a hypothesis for evaluation, wherein an axiom defines a class, and an assertion defines membership of an instance in a class, wherein belief axioms and belief assertions represent beliefs to be verified and wherein premise axioms and premise assertions represent facts that are assumed to be true;
        receiving, over the communications network, a first ontology against which to evaluate the hypothesis, wherein the first ontology comprises a plurality of axioms and a plurality of assertions;
        calculating a safe module of the first ontology, wherein a safe module comprises a subset of the plurality of axioms and the plurality of assertions of the first ontology;
        calculating a second ontology representation by converting the first set into an ontology representation of the first set;
        calculating a negation set of the first set, wherein the negation set comprises a plurality of belief axioms and a plurality of belief assertions with an opposite truth value as the plurality of belief axioms and the plurality of belief assertions of the first set;

calculating a third ontology representation by converting the negation set into an ontology representation of the negation set;

calculating whether the hypothesis is corroborated or contradicted by the first ontology, wherein said calculating is performed using an ontology reasoner configured to infer logical consequences of the safe module, the second ontology representation and the third ontology representation;

displaying a result of said calculating step over the communications network;

identifying which of the axioms and assertions of the first ontology contradict the hypothesis, based on the safe module and the second ontology representation, and displaying a result of said identifying step over the communications network; and identifying which of the axioms and assertions of the first ontology corroborate the hypothesis, based on the safe module, and the third ontology representation, and displaying a result of said identifying over the communications network.

2. The computer system of claim 1, wherein the first ontology is encoded using the Web Ontology Language (OWL).

3. The computer system of claim 2, wherein the second ontology representation is encoded using the Web Ontology Language (OWL).

4. The computer system of claim 3, wherein the third ontology representation is encoded using the Web Ontology Language (OWL).

* * * * *